US009508232B2

(12) United States Patent
Brown et al.

(10) Patent No.: US 9,508,232 B2
(45) Date of Patent: Nov. 29, 2016

(54) SHORT DEPTH CASH DRAWER WITH DOWNSTREAM CHECKOUT PLACEMENT

(75) Inventors: Jack Brown, Blaine, MN (US); Mark Stulz, Victoria, MN (US); Dan Adair, Andover, MN (US)

(73) Assignee: APG Cash Drawer, LLC, Minneapolis, MN (US)

(*) Notice: Subject to any disclaimer, the term of this patent is extended or adjusted under 35 U.S.C. 154(b) by 1715 days.

(21) Appl. No.: 12/351,610

(22) Filed: Jan. 9, 2009

(65) Prior Publication Data

US 2009/0179070 A1 Jul. 16, 2009

Related U.S. Application Data

(60) Provisional application No. 61/010,754, filed on Jan. 11, 2008.

(51) Int. Cl.
*G06K 15/00* (2006.01)
*G07G 1/00* (2006.01)
*A47F 9/04* (2006.01)

(52) U.S. Cl.
CPC ............... *G07G 1/0027* (2013.01); *A47F 9/04* (2013.01)

(58) Field of Classification Search
USPC .................................................... 235/22, 383
See application file for complete search history.

(56) References Cited

U.S. PATENT DOCUMENTS

| | | | | |
|---|---|---|---|---|
| 4,436,989 | A | 3/1984 | Schuldt | 235/22 |
| 5,371,344 | A | 12/1994 | Buie et al. | 235/1 R |
| 5,390,764 | A | 2/1995 | Kerber | 186/68 |
| D358,162 | S | 5/1995 | Buie et al. | D18/4 |
| 5,494,136 | A * | 2/1996 | Humble | 186/61 |
| 5,723,850 | A | 3/1998 | Lambert | 235/22 |
| 6,286,758 | B1 * | 9/2001 | Dejaeger et al. | 235/383 |
| 6,390,363 | B1 | 5/2002 | Morrison et al. | 235/383 |
| 6,729,242 | B2 | 5/2004 | Kerber | 108/42 |
| 6,834,596 | B2 | 12/2004 | Kerber | 108/42 |
| 7,059,513 | B2 | 6/2006 | Daugs et al. | 235/10 |
| 2002/0189502 | A1 * | 12/2002 | Kerber | 108/42 |
| 2003/0205177 | A1 * | 11/2003 | Kerber | 108/42 |
| 2005/0263580 | A1 | 12/2005 | Stulz et al. | 235/22 |

OTHER PUBLICATIONS

Cashier Console from P.O.S. Tech advertisement, Jun. 2002.
Cash Bases Inc. "The Advantage Range" advertisement, Sep. 1999.
Cash Bases Inc. "Technical Specifications" Sep. 1999.
Cash Bases Inc. ""U" Shaped Drawer for Integration with a Flatbed Scanner", at least by Sep. 1999.

* cited by examiner

*Primary Examiner* — Daniel Hess

(74) *Attorney, Agent, or Firm* — Katherine M. Scholz; Kelly, Holt & Chirstenson PLLC

(57) ABSTRACT

Embodiments described herein pertain to checkout stands and related components. Checkout stands illustratively include scanners and cash drawers. In some embodiments, cash drawers are located downstream from scanners. In some embodiments, checkout stands include item entering and exiting sides. Scanners are illustratively positioned between an entering side and a cash drawer, and cash drawers are illustratively positioned between a scanner and an exiting side.

20 Claims, 9 Drawing Sheets

SHORT DEPTH CASH DRAWER WITH DOWNSTREAM CHECKOUT PLACEMENT

The present application is based on and claims the benefit of U.S. Provisional Patent Application Ser. No. 61/010,754, filed Jan. 11, 2008, the content of which is hereby incorporated by reference in its entirety.

BACKGROUND

Anyone who has been in a retail store is familiar with the checkout stand. The checkout stand is where one pays for selected items. Checkout stands, also commonly referred to as check stands, can be arranged in a broad variety of configurations. The checkout stand may include one belt, two belts, three belts, or merely have a stationary surface, generally supported by a counter or cabinet. A bar code scanner is typically recessed into the counter or cabinet. Also included at the checkout stand are the cash drawer, a secured payment device (often referred to as a credit card swipe and pin pad machine), a receipt printer, monitor or monitors, and other such equipment.

A goal within the industry has been to arrange the checkout stand in a manner that is convenient for both the customer and the cashier. For customers, the layout of the checkout stand can enhance or deter from their experience which can affect whether or not a customer shops at that store again. For example, a cluttered or disorganized checkout stand may be viewed as being messy and uninviting.

For the cashier, standing at the checkout stand is a daily occurrence with repetitive motions. Depending upon the positioning or location of the cash drawer within the checkout stand, the cashier may have to twist or rotate from the scanner to the cash drawer and back to the customer. This may cause the cashier to lose eye contact with the customer as well as their view of the cash drawer, which may be inadvertently left open as they again turn to face the customer.

In general, there is a need for a checkout stand that allows access to available equipment and provides a configuration that is friendly and convenient to both the customer and the cashier. An arrangement that minimizes cashier fatigue and injury potential to twisting stresses and that provides cash drawer security is also desired.

SUMMARY

Embodiments described herein pertain to checkout stands and related components. Checkout stands illustratively include scanners and cash drawers. In some embodiments, cash drawers are located downstream from scanners. In some embodiments, checkout stands include item entering and exiting sides. Scanners are illustratively positioned between an entering side and a cash drawer, and cash drawers are illustratively positioned between a scanner and an exiting side.

BRIEF DESCRIPTION OF THE DRAWINGS

FIG. 1-2 is top view of a checkout stand.

FIG. 2-1 is a front isometric view of a short depth cash drawer.

FIG. 2-2 is a front view of a short depth cash drawer.

FIG. 2-3 is a side view of a short depth cash drawer.

FIG. 3 is a rear isometric view of a short depth cash drawer with outer panels removed.

FIGS. 4-1, 4-2, and 4-3 are perspective views of a short depth cash drawer transitioning from an open position to a closed position.

DETAILED DESCRIPTION

Figure 1:
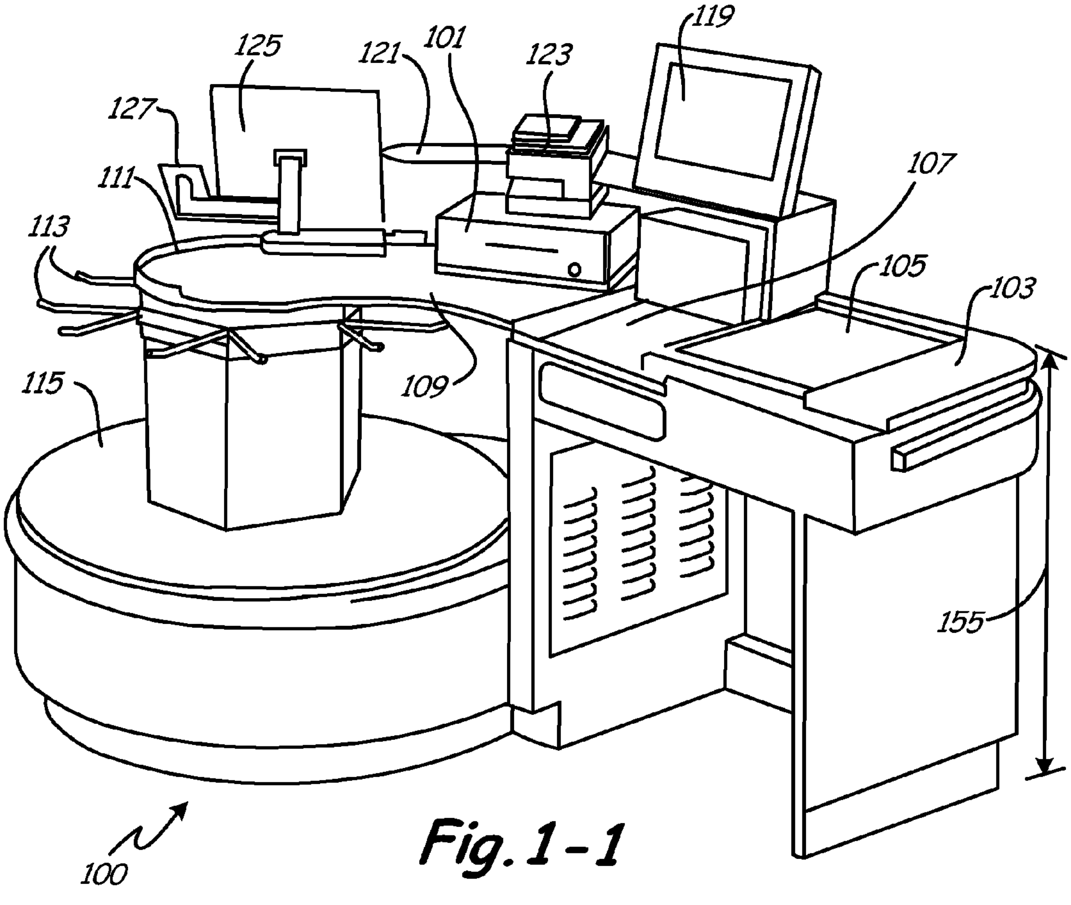
FIG. 1-1 is a perspective view of a checkout stand.
Figures 1, 2:
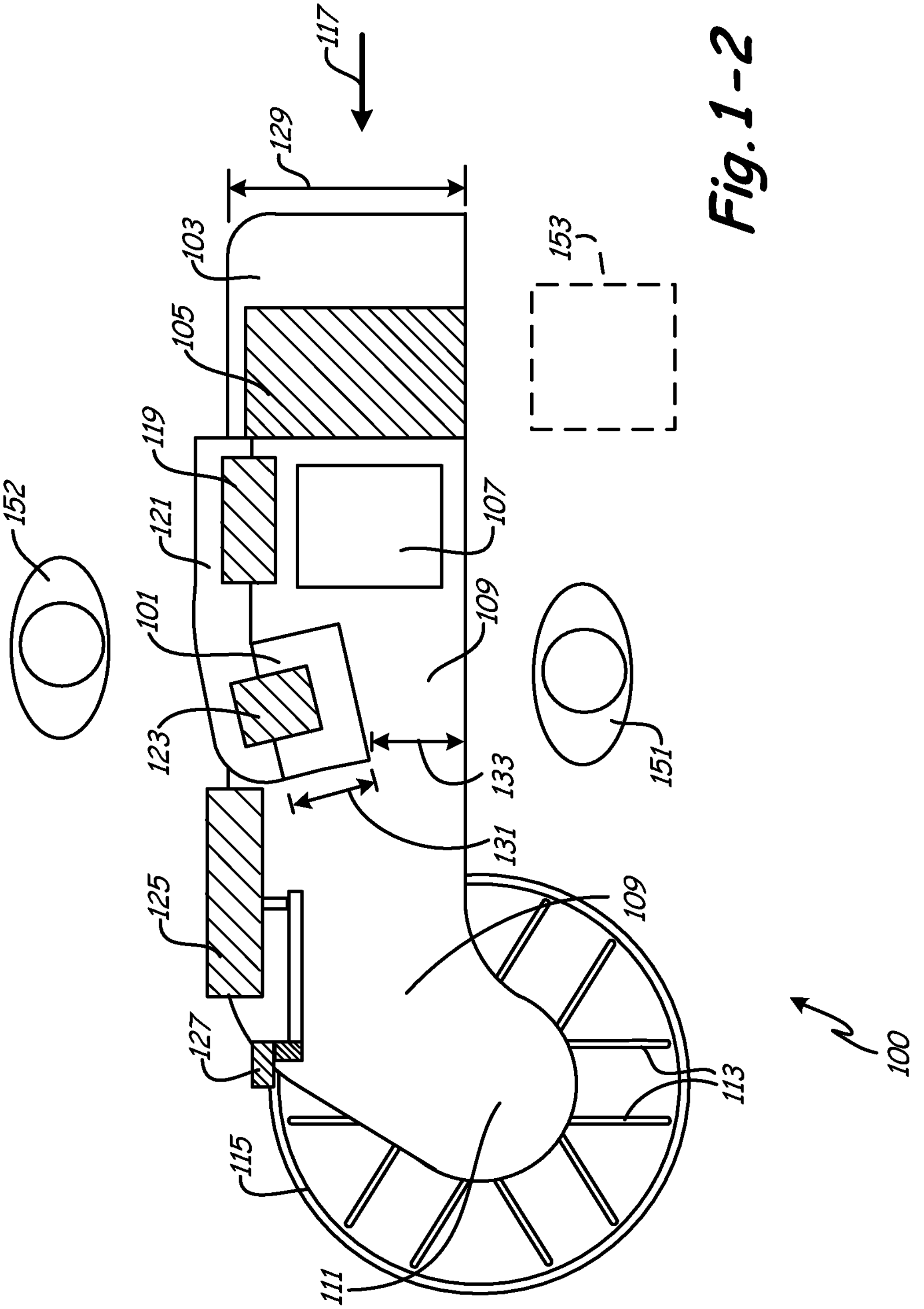

FIG. 1-1 is a perspective view of checkout stand 100 with a downstream cash drawer 101, and FIG. 1-2 is a top view of check out stand 100 with a downstream cash drawer 101. Certain embodiments disclosed herein may be practiced with checkout stands such as stand 100 and cash drawers such as drawer 101. The present invention is not however limited to any particular type or variation of checkout stand or drawer. Checkout stands and drawers are known to include a wide variety of features and devices to meet the individual needs and requirements of their users. Implementation with types and variations of checkout stands and drawers other than those shown in FIGS. 1-1 and 1-2 are within the scope of the present disclosure.

Checkout stand 100 includes a loading surface 103, a conveyor belt 105, a scanner 107, a work surface 109, and a bagging area 111. Items being checked out are illustratively rested upon loading surface 103 and then placed on belt 105 to move them to scanner 107. A cashier 151 picks up the items and scans bar codes on the items across a scanning surface of scanner 107 to register the items being sold and their prices. The items are then moved across work surface 109 to bagging area 111 where the items are placed in bags so that they can be carried or carted away. Stand 100 optionally includes bag holders 113 and a rotating bag stand 115 that allow for cashiers such as cashier 151 to easily place items in bags and for customers such as customer 152 to easily remove the bags filled with items.

FIG. 1-2 includes arrow 117. Arrow 117 represents the direction of movement of items through the checkout stand. Checkout stand features and processes may be described in reference to arrow 117 (i.e. the direction of movement of items through the checkout stand). For example, items are placed on conveyor belt 105 before they are scanned by scanner 107. Scanner 107 may be described as being downstream from belt 105, and belt 105 may be described as being upstream from scanner 107. Embodiments of the present disclosure are not however limited to any particular characterization such as being upstream or downstream. For example, stand 100 can alternatively be viewed as having an item entering or loading side at or around loading surface 103 and/or conveyor belt 105, and having an item exiting or unloading side at or around bagging area 111 or work surface 109. Placements of features and locations of devices within checkout stand 100 are also illustratively described with reference to these entering/loading and exiting/unloading sides.

Stand 100 also includes a cashier monitor 119, a raised ledge 121, a printer 123, a customer monitor 125, and a customer secured payment device 127. Cashier monitor 119 allows for cashier 151 to monitor and control the checkout process. Monitor 119 is illustratively a touch-screen monitor that allows for a cashier to input commands or data. Optional raised ledge 121 provides a surface for customer 152 to write a check or to place a coupon and illustratively separates customers from cash drawer 101. Printer 123 may be used to print materials such as receipts or coupons. Customer monitor 125 allows for customers to monitor the status of the checkout process. Like cashier monitor 119, customer monitor 125 is illustratively a touch-screen monitor that allows for a customer to input commands or data (e.g. selection of a payment option). Secured payment device 127 enables a customer to make a secured purchase such as by swiping a credit card or entering a personal identification number.

As was previously mentioned, checkout stands are known to include a wide variety of features and devices. Embodiments of the present disclosure are not limited to the features and devices in FIGS. 1-1 and 1-2. Embodiments also include other features and devices. Similarly, embodiments of the present disclosure do not need to include the features and devices shown in FIGS. 1-1 and 1-2.

As has been previously mentioned, stand 100 includes cash drawer 101. Drawer 101 securely stores money and other valuables or important materials. FIGS. 1-1 and 1-2 show drawer 101 in a closed position. Drawer 101 includes a moveable drawer that opens above work surface 109 so that money or other materials may be put into it or removed from it. In a checkout process, customers commonly pay for their items with cash or check. Drawer 101 securely stores the cash or checks and may hold additional money so that cashiers can provide customers with change (i.e. return the difference between the amount given by the customer and the total price for the items).

FIGS. 1-1 and 1-2 show that drawer 101 is downstream from scanner 107 and that it is positioned upon work surface 109. FIGS. 1-1 and 1-2 show scanner 107 as a fixed position or stationary scanner. In another embodiment, check stand 100 includes a moveable scanner such as, but not limited to, a handheld scanner and cash drawer 101 is downstream from the moveable scanner. In yet another embodiment, checkout stand 100 does not have a scanner at all and the short depth cash drawer is downstream from a loading surface such as loading surface 103 and/or a conveyor belt such as conveyor belt 105. This downstream location of the cash drawer provides advantages over alternative locations.

In one conventional checkout stand, the cash drawer is positioned at or approximately at the area indicated by imaginary dotted box 153 in FIG. 1-2. When a drawer is located in this position, a cashier commonly must move or at least rotate to access the cash drawer. This can require additional time in the checkout process. It can also physically harm cashiers by necessitating repetitive twisting motions and can provide an unwelcoming situation for the customer in having the cashier turn away from them. When a cash drawer is downstream such as it is in checkout stand 100, these problems are reduced or eliminated. Downstream drawer 101 is inline with other checkout features (e.g. scanner 107 and bagging area 111). Cashiers do not need to move to a new position or rotate to access drawer 101. This reduces checkout process time, eliminates cashier moving or twisting, and allows for the cashier to face the customer while accessing the cash drawer.

In another conventional checkout stand, the drawer is positioned vertically above scanner 107 or in another elevated position within the checkout stand. In these situations, the elevated drawer may interfere with communications between cashiers and customers. It may also require cashiers to reach above where they are normally working which could cause cashier strain or fatigue. In yet another conventional checkout stand, the drawer is placed vertically beneath the scanner 107 or conveyor belt 105. In these situations, a cashier may need to reach below where they are normally working or may need to bend down to reach the drawer. These activities likewise could cause cashier strain or fatigue. When a drawer is positioned as it is in FIGS. 1-1 and 1-2, these issues are reduced or eliminated. For example, FIG. 1-1 shows a height 155. Drawer 101 is located approximately at the same height or within a short distance (e.g. less than six inches) of other checkout stand devices and features such as conveyor belt 105, scanner 107, and work surface 109. A cashier does not need to reach to an elevated or lowered location that is relatively far from other checkout stand features to access drawer 101. Similarly, drawer 101 does not obstruct or interfere with communications between a cashier and a customer as is the case with some conventional elevated drawers.

FIG. 1-2 shows that cash drawer 101 has a depth 131. In one embodiment of a checkout stand with a downstream cash drawer, a normal depth cash drawer is used. In another embodiment of a checkout stand with a downstream cash drawer, a short depth cash drawer is used. A short depth cash drawer is illustratively a cash drawer with a depth that is less than twelve inches. As will be described below, the combination of a short depth cash drawer and a downstream checkout stand provides advantages over other configurations.

As was previously mentioned, FIG. 1-2 shows that cash drawer 101 has a depth 131. FIG. 1-2 also shows that stand 100 has a depth or approximate depth 129 and that work surface 109 has a clearance space 133 between drawer 101 and the edge of the work surface. An adequate amount of clearance space 133 is needed to move items between scanner 107 and the unloading/exiting side or bagging area 111. If a cash drawer with a relatively larger depth is used in stand 100 instead of a short depth cash drawer, the larger depth drawer takes up more of work surface 109 and reduces the amount of clearance space 133. This would be very disadvantageous because as was previously mentioned, a proper amount of clearance space 133 is needed to move items through the checkout stand. Alternatively, if a larger depth cash drawer is used, the depth 129 of checkout stand 100 could be increased to maintain the same amount of clearance space 133. This would similarly be very disadvantageous because it would increase the amount of floor space needed for the checkout stand (i.e. it would increase the checkout stand footprint). The use of a short depth cash drawer in combination with the downstream checkout stand provides the benefits associated with having a downstream checkout drawer that were previously discussed, while maintaining clearance space and maintaining a relatively small checkout stand footprint.

Figures 1, 2:
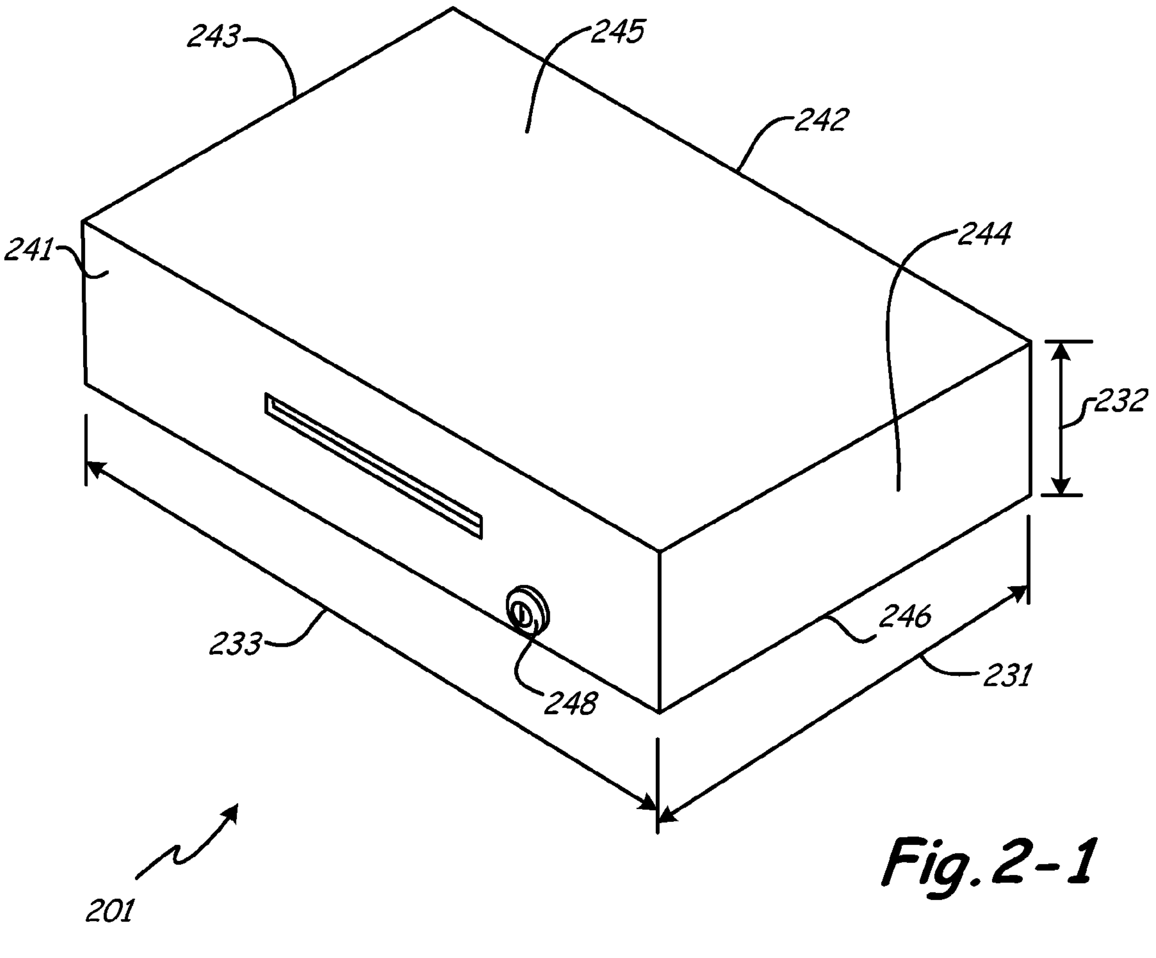
Figure 2:
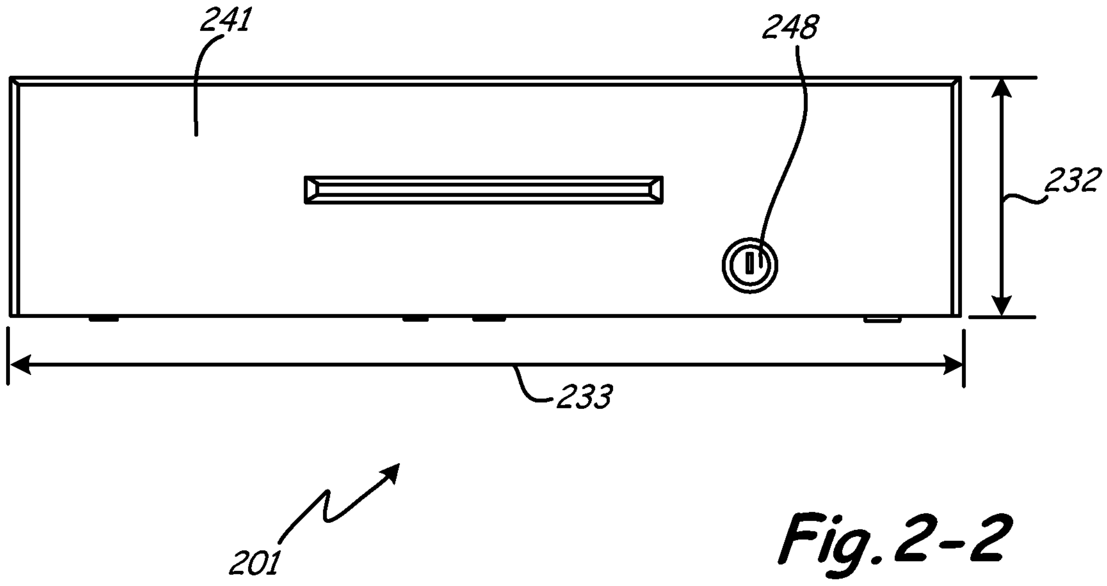
Figures 2, 3:
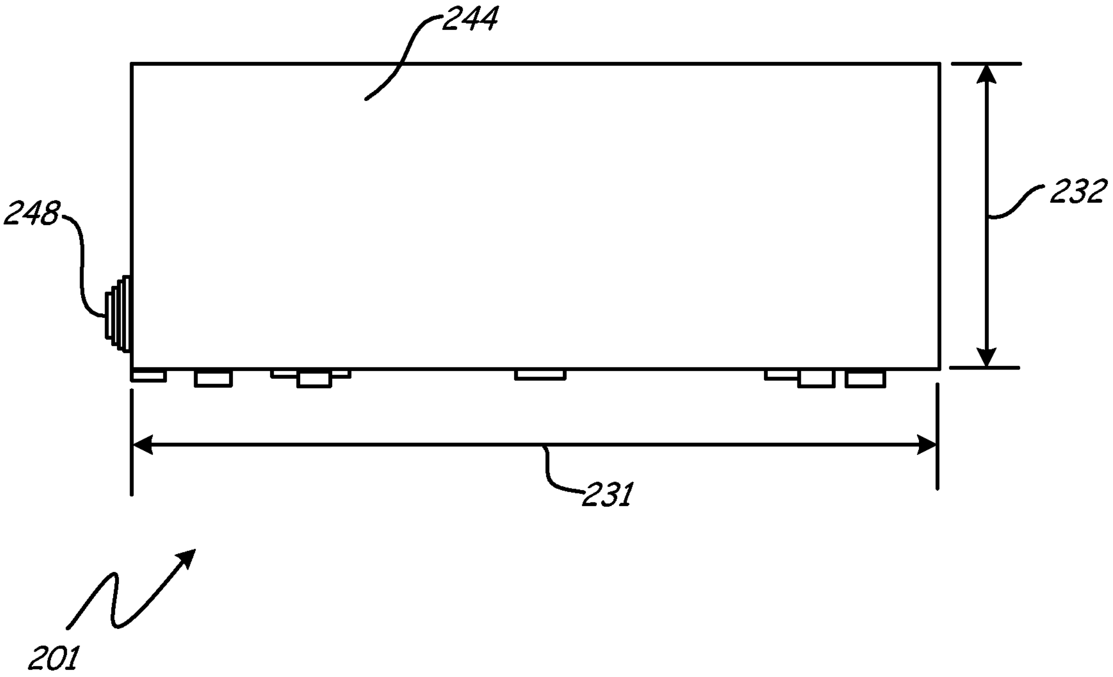
Figure 3:
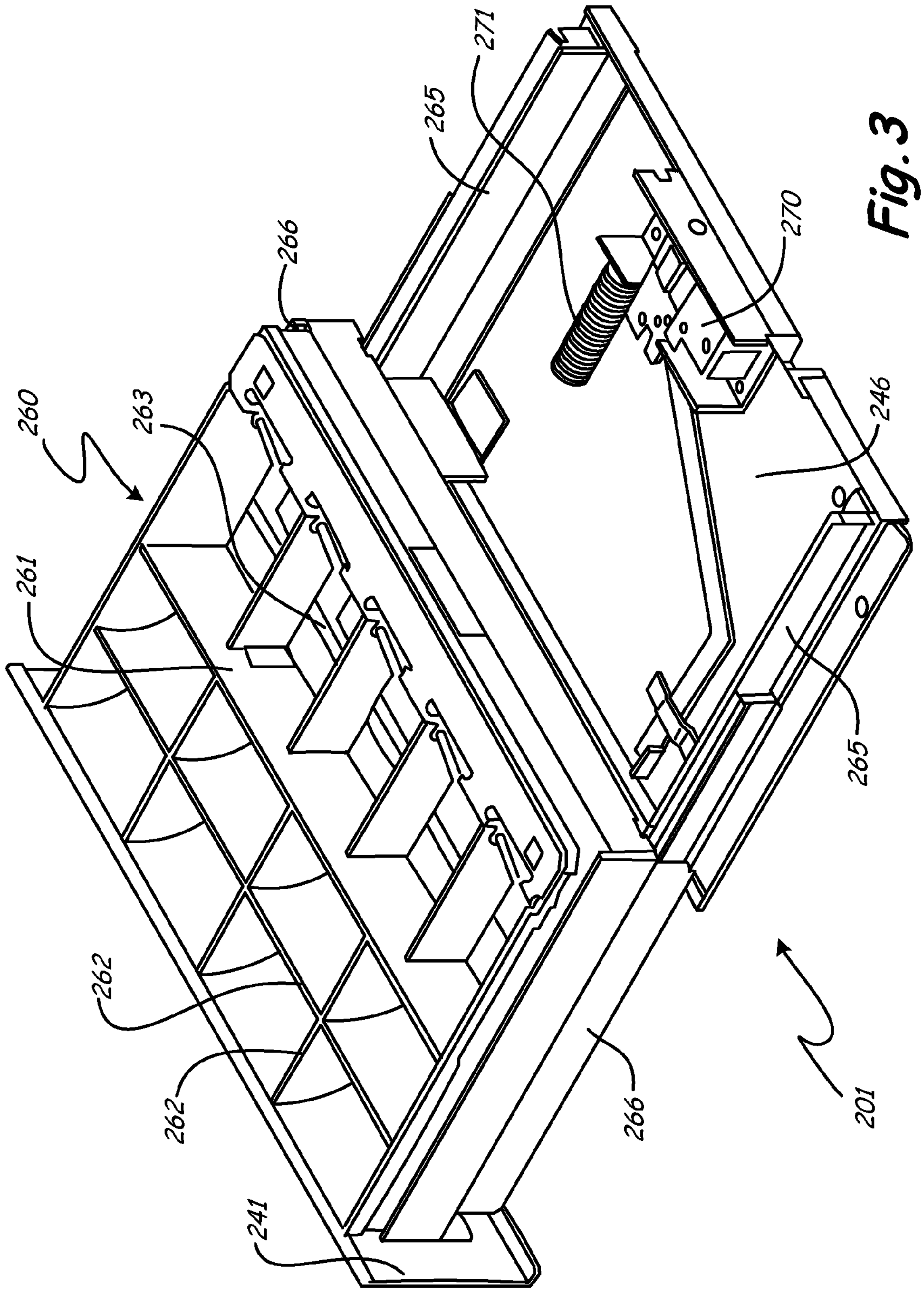

FIGS. 2-1, 2-2, and 2-3 show an embodiment of a short depth cash drawer 201. Drawer 201 is illustratively a cash drawer such as drawer 101 in FIGS. 1-1 and 1-2. Drawer 201 may be used in a downstream checkout stand such as checkout stand 100 in FIGS. 1-1 and 1-2. Drawer 201 may also be used and provide advantages in arrangements other than in downstream checkout stands.

FIG. 2-1 is a front isometric view of drawer 201. FIG. 2-2 is a front view of drawer 201, and FIG. 2-3 is a side view of drawer 201. Drawer 201 includes a depth 231 that is analogous to depth 131 shown in FIG. 1-2. Depth 231 is less than the depth of conventional drawers. Depth 231 is illustratively less than twelve inches. For example, in one embodiment, depth 231 is eleven and one half inches. This short depth provides advantages in downstream checkout stands as has been previously discussed in reference to FIG. 1-2. The short depth of drawer 201 also provides advantages in other arrangements. For example, in a checkout stand with a cash drawer above the scanner, drawer 201 takes up less space (i.e. a smaller footprint). This may enable the overall footprint of such a checkout stand to be reduced. The short depth of drawer 201 may similarly enable the footprints of other checkout stand arrangements to be reduced.

Drawer 201 also includes a height 232 and a width 233. Height 232 and width 233 may be varied as needed and are not limited to any particular dimensions. Height 232 is illustratively between two and eight inches, and width 233 is illustratively between six and thirty inches. In one embodiment, height 232 is four and a half inches and width 233 is sixteen inches.

Drawer 201 has an outer front panel 241, an outer back panel 242, an outer left panel 243, an outer right panel 244, an outer top panel 245, and an outer bottom panel 246. The outer panels 242-246 illustratively form a housing or case of the cash drawer. As will become more clear later in this specification, this case or housing remains static or stationary and encloses a moveable drawer that illustratively extends out from the case or housing. Drawer 201 also optionally includes a locking mechanism 248. Mechanism 248 is illustratively operated by a key and enables a user to manually open the drawer. Mechanism 248 is not however limited to any particular devices or methods.

FIG. 3 is rear isometric view of short depth cash drawer 201 with outer panels 242-245 removed. FIG. 3 includes the same outer front panel 241 and outer bottom panel 246 that are shown in FIG. 2-1. FIG. 3 also shows a moveable drawer 260. Moveable drawer 260 is shown to be holding a till 261. Till 261 is illustratively removable from drawer 260. Till 261 optionally includes a series of dividers 262 and retaining arms 263 that store and organize money and other items. Embodiments of till 261 are not limited to any particular design and include any design and/or features that may be required by a user.

FIG. 3 shows that outer bottom panel has a pair of slides 265 and that moveable drawer 260 has a pair of complimentary slides 266. Slides 265 and 266 work in combination to enable moveable drawer 260 to be moved into and out of the cash drawer housing or case (i.e. outer panels 242-246). Although short depth cash drawer 201 is shown to have slides 265-266, embodiments are not limited to any particular methods or devices of facilitating drawer 260 to move relative to its housing or case. Those skilled in the art will recognize that there are many methods and devices that will facilitate this movement, and embodiments include all of these methods and devices.

FIG. 3 also shows a latching mechanism 270 that includes a spring 271. Mechanism 270 selectively holds moveable drawer 260 in a closed position as is shown in FIGS. 2-1, 2-2, and 2-3. Spring 271 supplies a bias or force against moveable drawer 260 when it is in the closed position such that when the latching mechanism 270 disengages its connection with drawer 260, drawer 260 opens. Mechanism 270 is illustratively manually controlled, for example by mechanism 248 shown in FIGS. 2-1, 2-2, and 2-3. Mechanism 270 is also illustratively remotely controlled such as, but not limited to, by an electronic signal or pneumatic force that controls whether the drawer is open or closed. Many latching, securing, and opening/closing devices and methods are known in the art, and the present invention is not limited to those shown in FIG. 3 or even to any particular methods or devices. Embodiments of the present disclosure include all methods and devices. It is however important to note the positioning of mechanism 270. As is shown in FIG. 3, mechanism 270 is located vertically beneath moveable drawer 260. In an embodiment, latching mechanism 270 is completely beneath drawer 260 (i.e. no part of mechanism 270 is in drawer 260 or to the front, back, left, right, or top of drawer 260) when drawer 260 is closed.

FIGS. 4-1, 4-2, and 4-3 are perspective views of a short depth cash drawer 401 transitioning from an open position to a closed position. Drawer 401 is illustratively a drawer such as drawer 101 used in a checkout stand such as checkout stand 100. Drawer 401 is also illustratively a drawer such as drawer 201 in FIGS. 2-1, 2-2, 2-3, and 3. Drawer 401 includes many of the same components as drawer 201 and is numbered accordingly. Drawer 401 illustratively includes outer left, right, top, and back panels such as panels 242-245 shown in FIGS. 2-1, 2-2, and 2-3. Those outer panels however have been removed from FIGS. 4-1, 4-2, and 4-3 to better show additional features of short depth cash drawers.

Figures 1, 4:
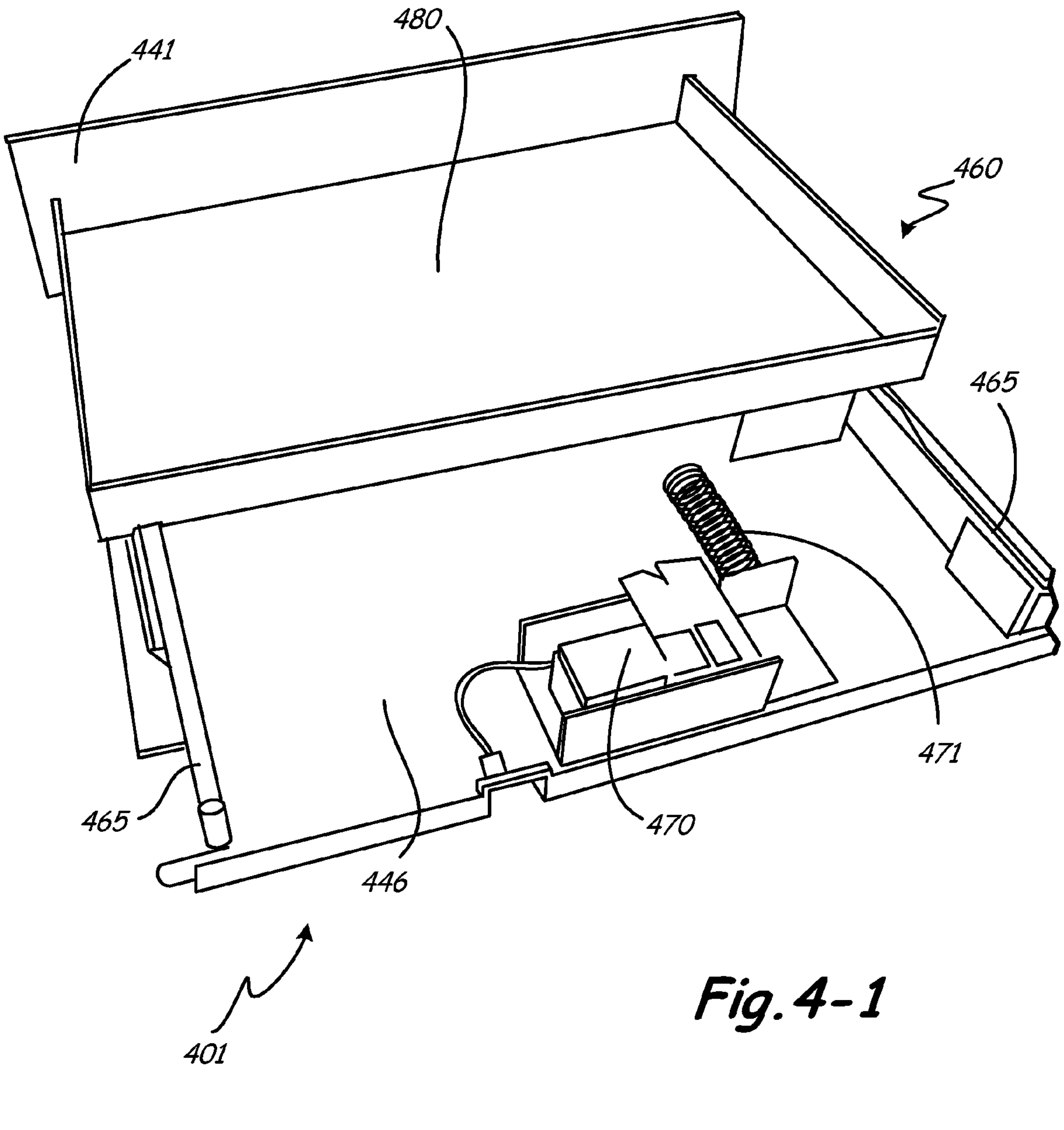
Figures 2, 4:
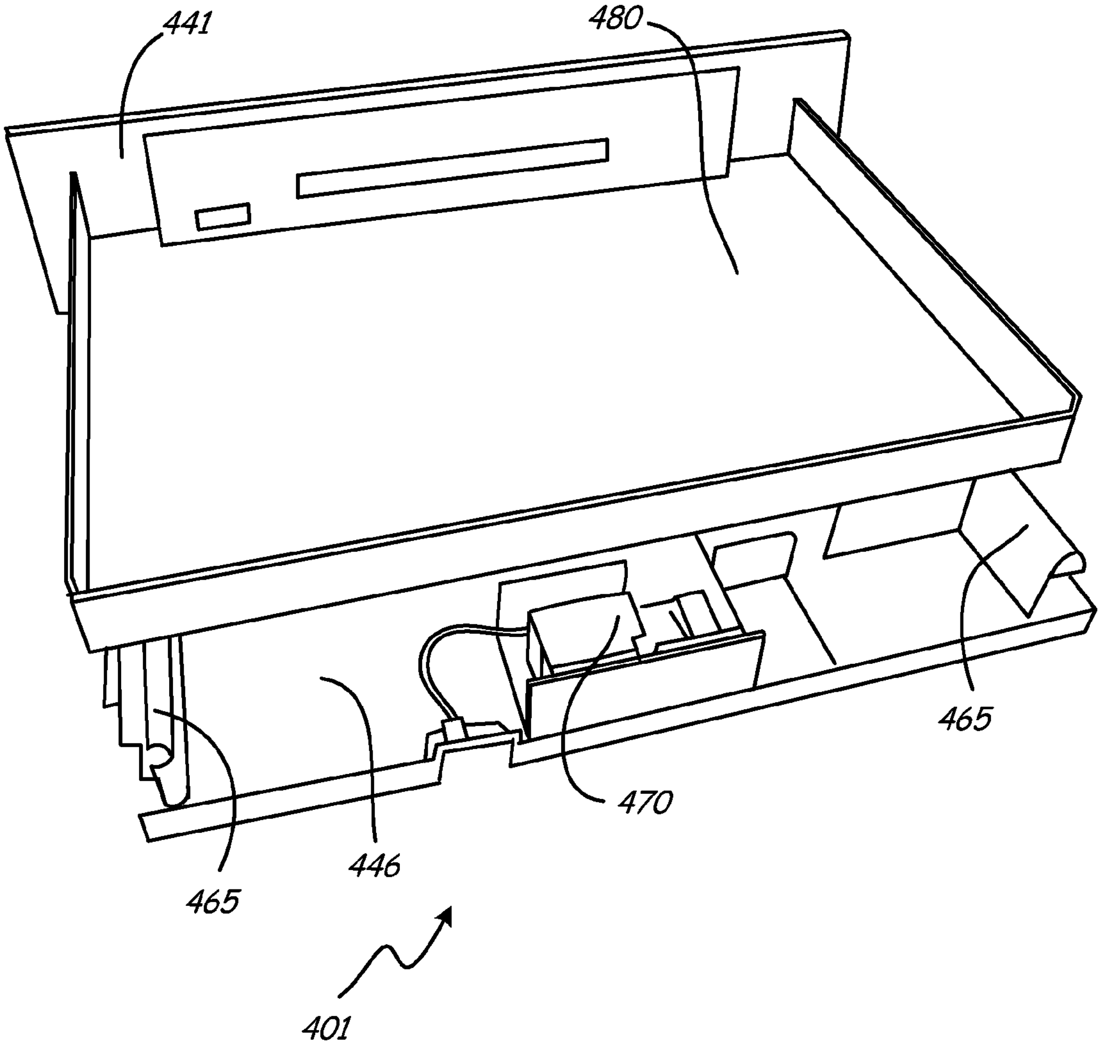
Figures 3, 4:
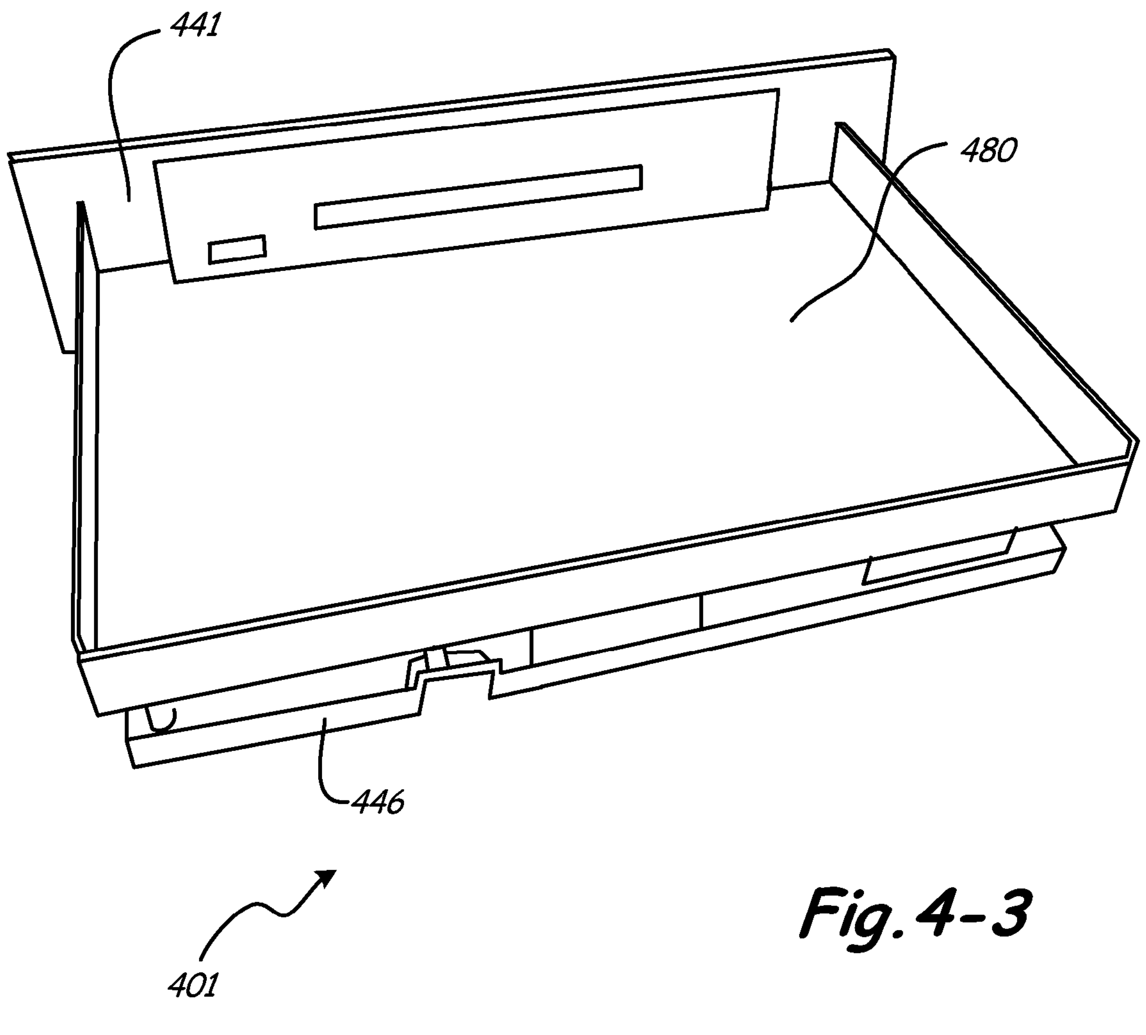

FIG. 4-1 shows drawer 401 in an open position (i.e. moveable drawer 460 extended outward from the drawer housing or casing that is represented by outer bottom panel 446). FIG. 4-2 shows drawer 401 in an intermediate state (i.e. partially open), and FIG. 4-3 shows drawer 401 in a closed position.

FIG. 4-1 shows that moveable drawer 460 includes an inner moveable panel 480. In an embodiment, drawer 401 includes a till such as till 261 shown in FIG. 3 and the till rests upon and is positioned within panel 480. It should be noted that in an embodiment, drawer 101 in FIGS. 1-1 and 1-2, and drawer 201 in FIGS. 2-1, 2-2, 2-3, and 3 also include an inner moveable panel. In those drawings however, the inner moveable panels are not visible due to being covered by either the drawer housing or the till.

As can be seen in FIGS. 4-1, 4-2, and 4-3, when drawer 401 is in a closed position, latching mechanism 470 is completely contained in the area vertically beneath inner moveable panel 480. No part of the latching mechanism is in an area to the left, right, front, rear, or top of panel 480. This feature enables drawer 401 and other short depth drawers such as drawer 101 in FIGS. 1-1 and 1-2, and drawer 201 in FIGS. 2-1, 2-2, 2-3, and 3 to have short depths 431, 131, and 231, and overall smaller footprints (i.e. the area represented by the depth of the drawer times the width of the drawer, such as width 233 in FIGS. 2-1 and 2-2). In an embodiment, the depth and footprint of a short depth cash drawer is only limited by whatever the user desires the size of the till to be. For example, if a user only wanted or needed a till that holds two types of paper U.S. dollar bills, the depth and footprint could be made to the size of the bills plus a little extra space for the cash drawer housing (i.e. the outer panels such as panels 241-246 shown in FIG. 2-1). This advantageous feature is of course possible by positioning and containing the latching mechanism completely within the area beneath the inner moveable panel or till. In another embodiment, a portion of the latching mechanism is partially outside of the inner moveable panel or till area. In such an embodiment, improvements in depth and footprint are still made by partially including the latching mechanism beneath the inner moveable panel or till area.

Although the present disclosure has been described with reference to certain embodiments, those skilled in the art will recognize that changes may be made in form and detail, especially in matters of structure and arrangements of parts, without departing from the scope and spirit of the disclosure.

What is claimed is:

1. A checkout stand comprising:

a scanner;

a short depth cash drawer, wherein the short depth cash drawer is located downstream from the scanner in relation to a direction of movement of items through the checkout stand, wherein the short depth cash drawer has an inner drawer that is moveable between an opened and a closed position, and wherein the inner drawer intersects the direction of movement of items through the checkout stand when it is in the opened position;

a customer area of the checkout stand;
a cashier area of the checkout stand;
a raised ledge that is at least approximately parallel to the direction of movement of items through the checkout stand, the raised ledge at least partially separating the customer area of the checkout stand from the cashier area of the checkout stand; and
wherein the scanner and the short depth cash drawer are located such that the raised ledge is between the cash drawer and the customer area of the checkout stand.

2. The checkout stand of claim 1 wherein an entirety of the cash drawer is located downstream from the scanner, wherein an entirety of the scanner is located upstream from the cash drawer, and wherein the checkout stand further comprises a stationary work surface that extends between the short depth cash drawer and the cashier area, and wherein the moveable inner drawer lies entirely above the stationary work surface when it is in the opened position.

3. The checkout stand of claim 1 wherein the cash drawer has a depth of less than twelve inches, and has a width of less than seventeen inches, wherein the checkout stand includes a work surface that is between an edge of the checkout stand and a front of the short depth cash drawer, wherein the work surface lies within a path for the movement of items through the checkout stand, and wherein the scanner, the short depth cash drawer, and the work surface are located at approximately a same vertical height such that their vertical heights are within six inches of each other.

4. The checkout stand of claim 1 wherein the cash drawer has a height of more than four inches and a depth of less than twelve inches, and wherein the cash drawer is angled with respect to the direction of movement of items through the checkout stand.

5. The checkout stand of claim 4 wherein the short depth cash drawer includes a spring-loaded latching mechanism that is located completely beneath the moveable inner drawer.

6. The checkout stand of claim 1 wherein a depth of the short depth cash drawer is less than twelve inches, and wherein the short depth cash drawer rests upon a work surface that has a fixed height.

7. The checkout stand of claim 1 and further comprising a clearance space that is between an edge of the checkout stand and a front of the short depth cash drawer, the clearance space having a width that is less than a width of the scanner, and wherein the scanner and the cash drawer at least partially overlap in the direction of movement of items through the checkout stand.

8. The checkout stand of claim 1 and further comprising an additional piece of supporting equipment that is located vertically above the short depth cash drawer.

9. A checkout stand comprising:
an item entering side;
an item exiting side;
a scanner;
a short depth cash drawer having an inner drawer that is moveable between an opened and a closed position;
a customer area;
a cashier area;
a stationary work surface that has a fixed height and that extends between the short depth cash drawer and the cashier area such that the customer area and the cashier area are at least partially separated along the length of the stationary work surface;
wherein the moveable inner drawer of the short depth cash drawer lies entirely above the stationary work surface when it is in the opened position;
wherein the scanner is positioned between the item entering side and the short depth cash drawer;
wherein the short depth cash drawer is positioned between the scanner and the item entering side; and
wherein the short depth cash drawer is positioned between the customer area and the cashier area.

10. The checkout stand of claim 9 wherein the scanner includes a scanner surface that is located at a height, wherein the checkout stand comprises a work surface that is located approximately at the height, wherein the short depth cash drawer rests upon the work surface, wherein the work surface includes a clearance space that is positioned between the cashier area and a front of the short depth cash drawer, and wherein the checkout stand further comprises an additional piece of supporting equipment that is located vertically above the short depth cash drawer.

11. The checkout stand of claim 10 wherein the cash drawer has a depth of less than twelve inches, and has a width of less than seventeen inches, wherein the clearance space is positioned between the item entering side and the item exiting side, and wherein the additional piece of supporting equipment includes a printer.

12. The checkout stand of claim 11 wherein the cash drawer has a height of more than four inches, wherein the clearance space forms a portion of an item movement path, wherein each of the clearance space and the scanner has a width that is at least approximately perpendicular to the item movement path, wherein the width of the clearance space is less than the width of the scanner, and wherein the scanner and the cash drawer at least partially overlap in a direction of the item movement path.

13. The checkout stand of claim 12 wherein the scanner is a fixed position scanner, and wherein the cash drawer is angled with respect to the direction of the item movement path.

14. The checkout stand of claim 9 wherein the short depth cash drawer includes a moveable inner drawer and a spring-loaded latching mechanism, the latching mechanism being located completely beneath the moveable inner drawer.

15. The checkout stand of claim 9 wherein the item entering side is an item loading side, wherein the item exiting side is an item unloading side, wherein the checkout stand further comprises a raised ledge, and wherein the scanner and the short depth cash drawer are located between the raised ledge and the cashier area.

16. The checkout stand of claim 15, wherein there is no vertical alignment between the cash drawer and the scanner, and wherein a height of the raised ledge is greater than a height of the short depth cash drawer.

17. A checkout stand comprising:
a scanner;
a short depth cash drawer, wherein the short depth cash drawer is located downstream from the scanner in relation to a direction of movement of items through the checkout stand, wherein the short depth cash drawer has an inner drawer that is moveable between an opened and a closed position, and wherein the inner drawer intersects the direction of movement of items through the checkout stand when it is in the opened position;
a customer area of the checkout stand;
a cashier area of the checkout stand;
a raised ledge that is at least approximately parallel to the direction of movement of items through the checkout stand, the raised ledge at least partially separating the customer area of the checkout stand from the cashier area of the checkout stand and wherein the raised ledge also separates the short depth cash drawer from the customer area of the checkout stand;

a stationary work surface that has a fixed height and that extends between the short depth cash drawer and the cashier area, wherein the moveable inner drawer lies entirely above the stationary work surface when it is in the opened position; and wherein the scanner, the short depth cash drawer, and the stationary work surface are located between the raised ledge and the cashier area.

18. The checkout stand of claim 17 wherein the short depth cash drawer is angled with respect to the direction of movement of items through the checkout stand.

19. The checkout stand of claim 17 and further comprising a printer that is located vertically above the short depth cash drawer.

20. The checkout stand of claim 17 wherein a height of the raised ledge is greater than a height of the short depth cash drawer.

* * * * *